(12) United States Patent
Zhao et al.

(10) Patent No.: US 11,639,005 B2
(45) Date of Patent: May 2, 2023

(54) ROBOTIC FINGER STRUCTURE AND ROBOT

(71) Applicant: UBTECH ROBOTICS CORP LTD, Shenzhen (CN)

(72) Inventors: Kunlei Zhao, Shenzhen (CN); Zheng Xie, Shenzhen (CN); Weizhi Shi, Shenzhen (CN); Minghua Chen, Shenzhen (CN); Zhaohui An, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 117 days.

(21) Appl. No.: 17/326,259

(22) Filed: May 20, 2021

(65) Prior Publication Data

US 2021/0370523 A1 Dec. 2, 2021

(30) Foreign Application Priority Data

May 26, 2020 (CN) .......................... 202010455928.4

(51) Int. Cl.
*B25J 15/00* (2006.01)
*B25J 9/12* (2006.01)
*B25J 15/02* (2006.01)

(52) U.S. Cl.
CPC ........... *B25J 15/0009* (2013.01); *B25J 9/123* (2013.01); *B25J 15/022* (2013.01); *B25J 15/0206* (2013.01)

(58) Field of Classification Search
CPC ... B25J 9/0006; B25J 9/06; B25J 9/106; B25J 9/123; B25J 15/0009; B25J 15/0206; B25J 15/022; B25J 17/0258
See application file for complete search history.

(56) References Cited

U.S. PATENT DOCUMENTS

| 11,351,042 | B2 * | 6/2022 | Jury | A61F 2/583 |
| 2013/0104686 | A1 * | 5/2013 | Yamazaki | B25J 15/0009 |
| | | | | 74/490.05 |
| 2016/0135967 | A1 * | 5/2016 | Moyer | A61F 2/586 |
| | | | | 623/64 |
| 2020/0206949 | A1 * | 7/2020 | Liu | B25J 9/104 |

FOREIGN PATENT DOCUMENTS

| CN | 101524846 B | * | 1/2011 | .......... B25J 15/0009 |
| KR | 20060093122 A | * | 8/2006 | .......... B25J 15/0009 |
| KR | 101167239 B1 | * | 7/2012 | .......... B25J 16/0009 |

* cited by examiner

*Primary Examiner* — Joseph Brown

(57) ABSTRACT

A robotic finger structure includes a proximal phalanx; a middle phalanx rotatably connected to one end of the proximal phalanx; a distal phalanx rotatably connected to one end of the middle phalanx and defining a distal phalanx opening in a front side thereof and at one end adjacent to the middle phalanx; a connecting rod having opposite ends that are rotatably connected to the proximal phalanx and the distal phalanx, and an actuating assembly to drive the middle phalanx to rotate with respect to the proximal phalanx. The connecting rod includes a first angled segment having a first recess facing a back side of the middle phalanx. When the distal phalanx is flush with the middle phalanx, the first angled segment passes through the distal phalanx opening, and a first end of the distal phalanx opening extends into the first recess.

20 Claims, 13 Drawing Sheets

ROBOTIC FINGER STRUCTURE AND ROBOT

CROSS REFERENCE TO RELATED APPLICATIONS

This application claims priority to Chinese Patent Application No. 202010455928.4, filed May 26, 2020, which is hereby incorporated by reference herein as if set forth in its entirety.

BACKGROUND

1. Technical Field

The present disclosure generally relates to robots, and particularly to a robotic finger structure and a robot having the finger structure.

2. Description of Related Art

One conventional robot has a finger that includes a linking member rotatably connecting one phalanx to another phalanx. Since the linking member is a one-degree-of-freedom system, it is difficult for the linking member to have certain elasticity to absorb the impact and shock when the finger structure is subjected to impact.

Therefore, there is a need to provide a finger structure to overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
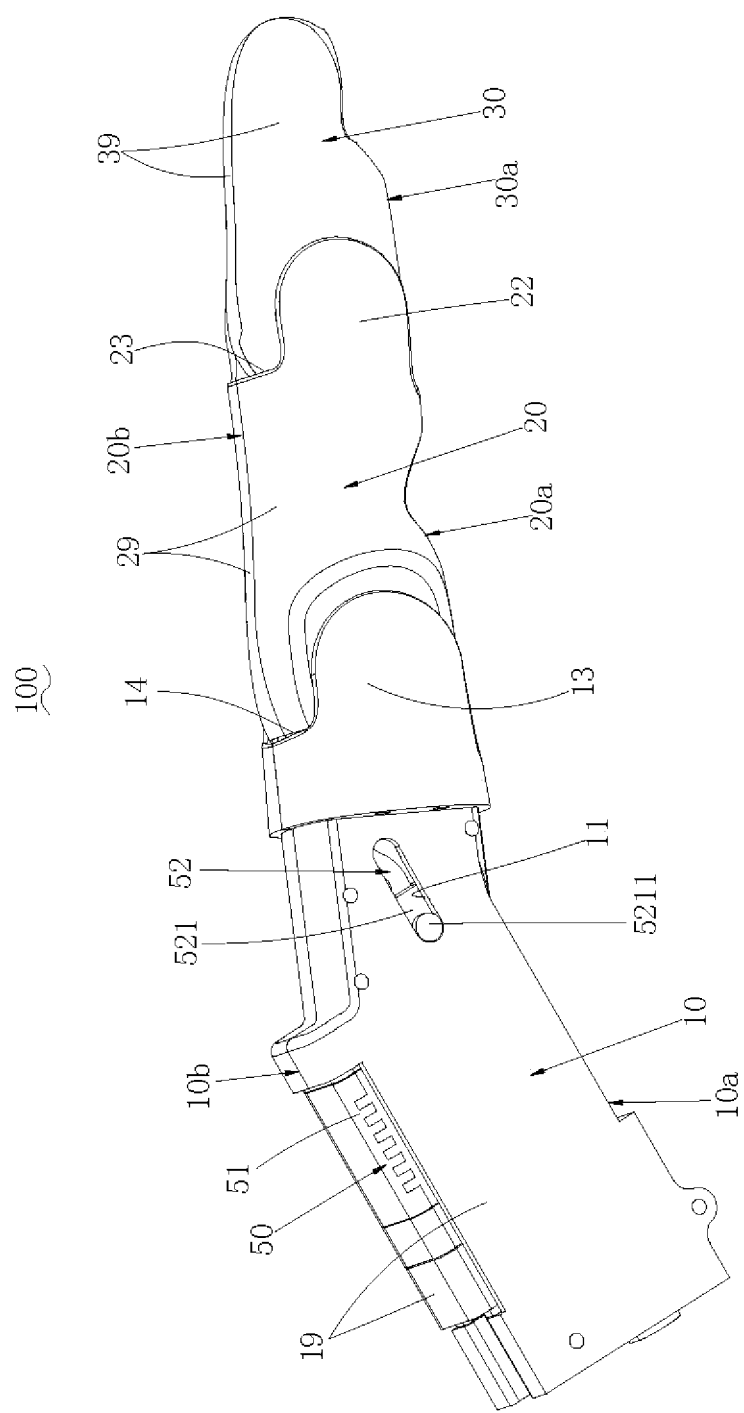
FIG. 1 is a schematic isometric view of a finger structure according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
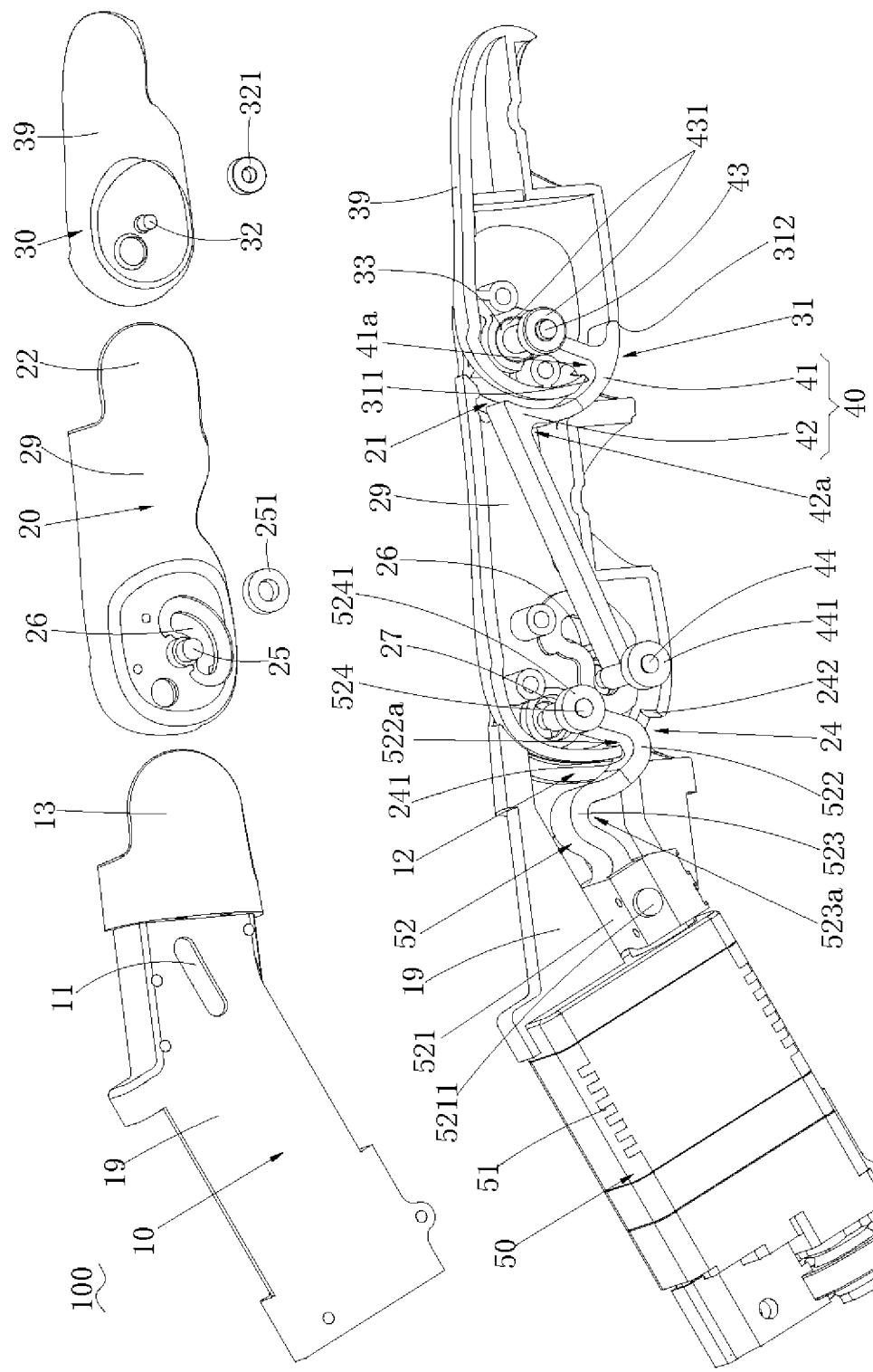
FIG. 2 is a schematic isometric exploded view of the finger structure.
Figure 3:
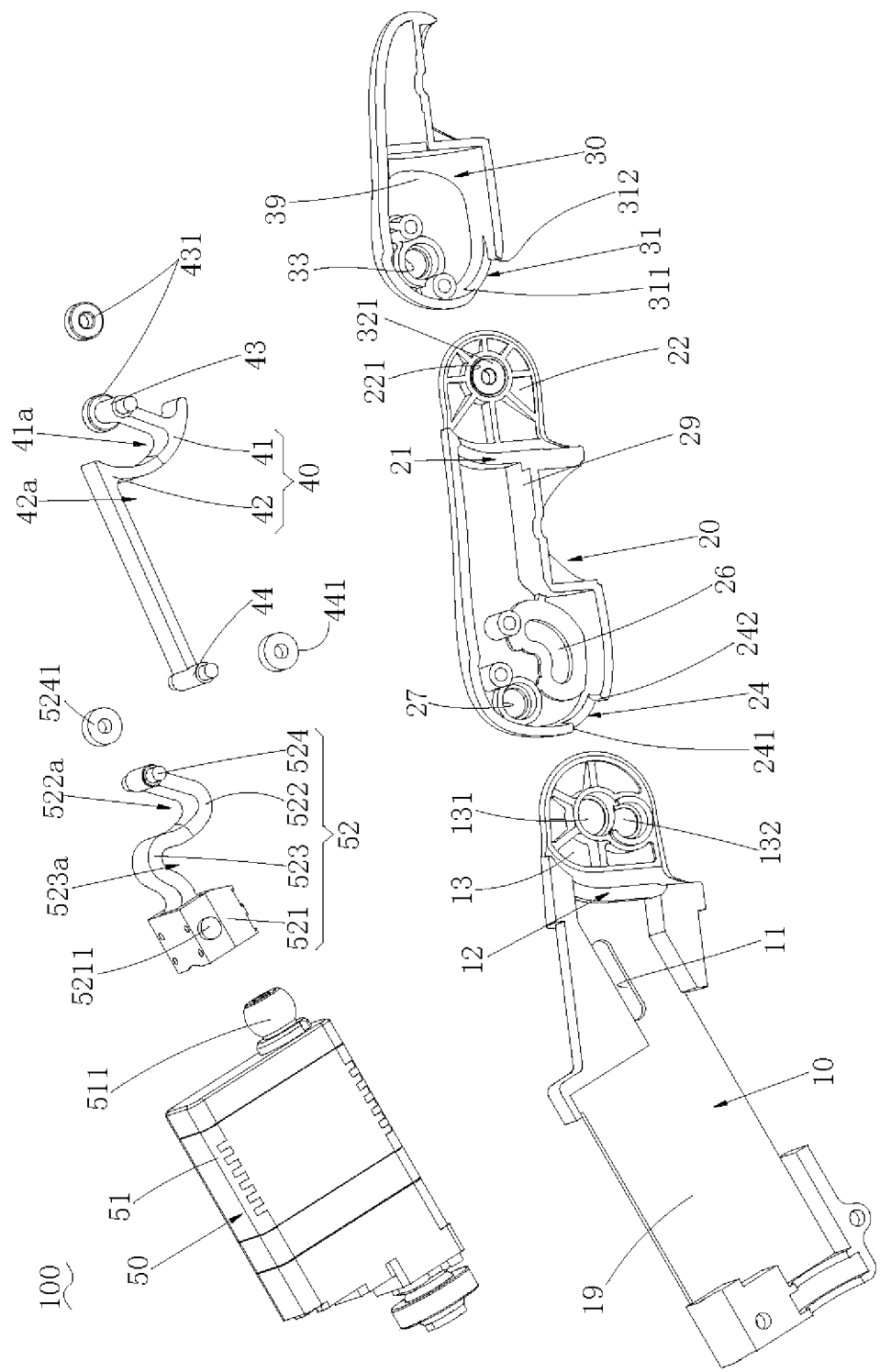
FIG. 3 is a schematic isometric exploded view of the finger structure.
Figure 4:
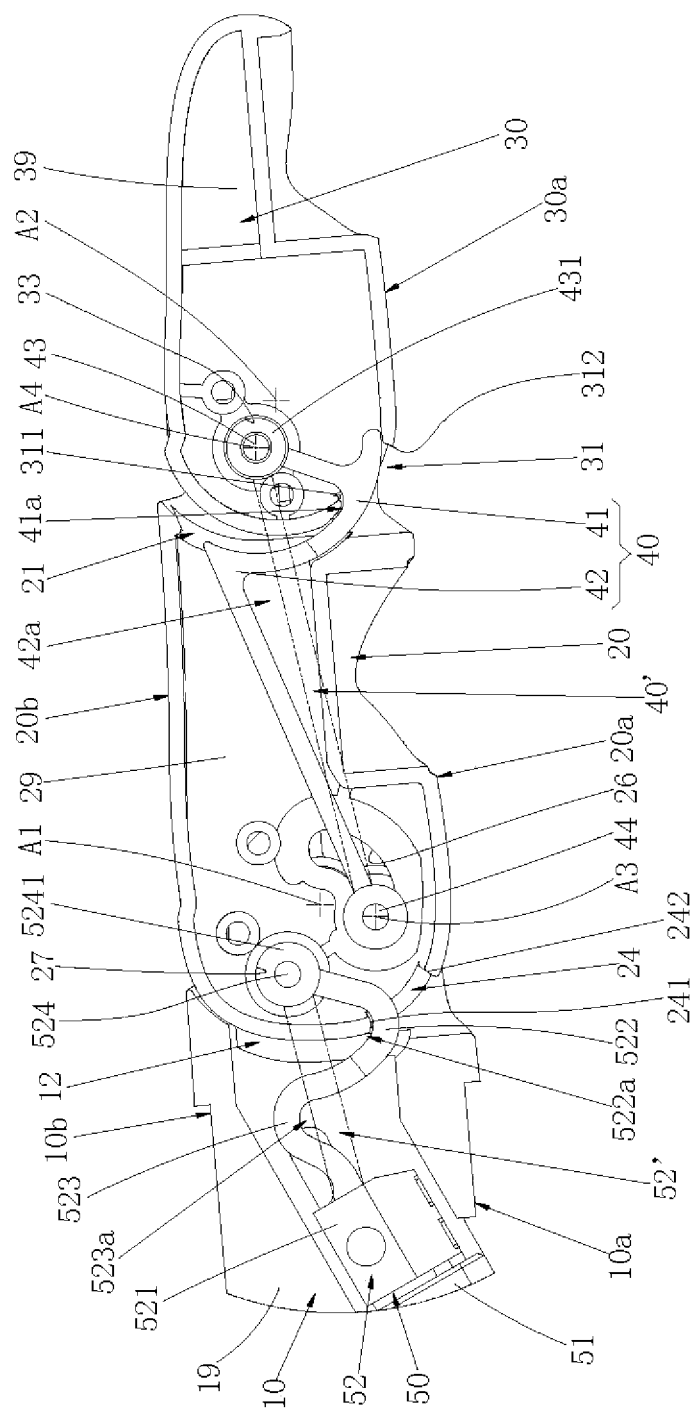
FIG. 4 shows the finger structure of FIG. 1 in an extended state, with certain components omitted.
Figure 5:
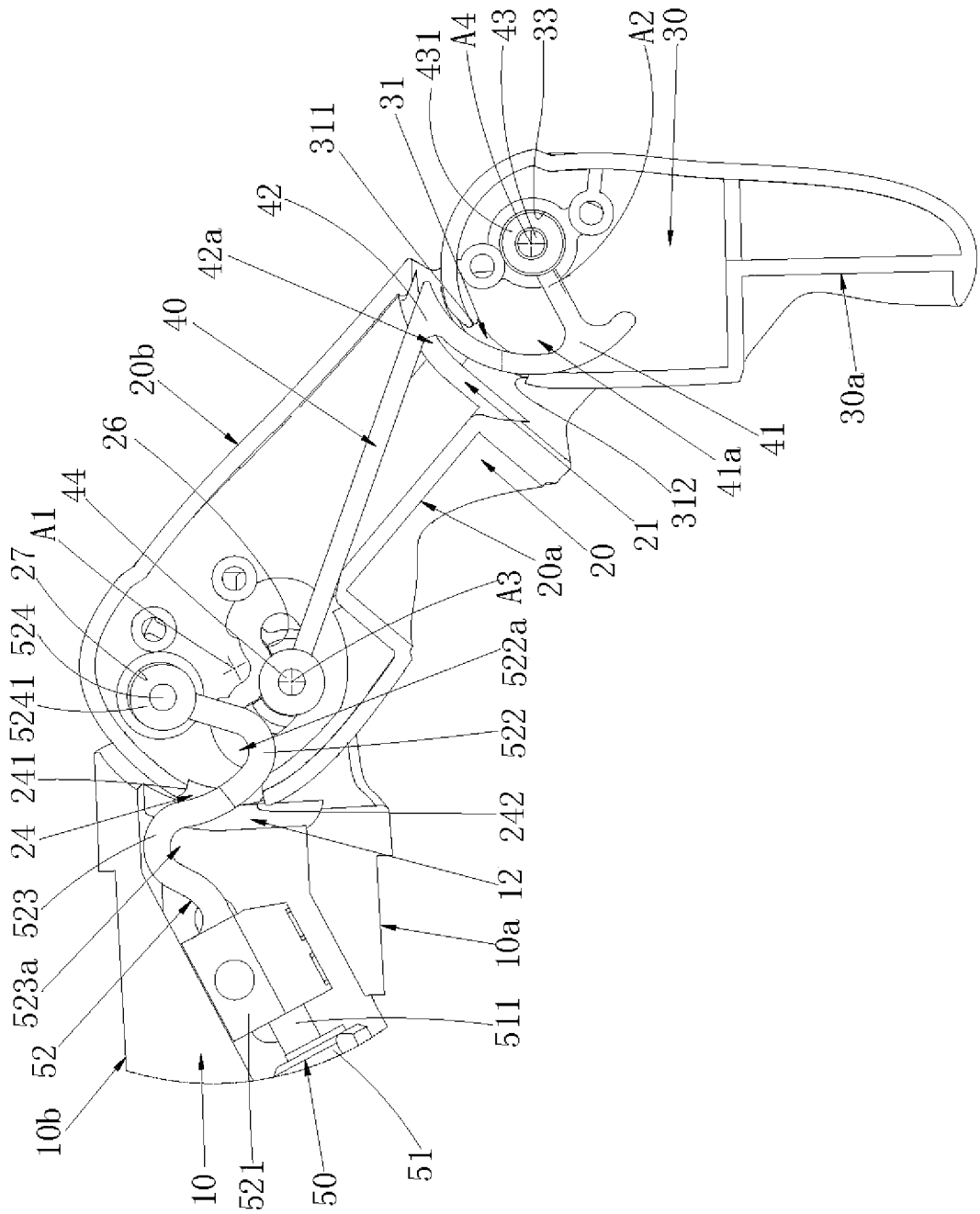
FIG. 5 shows the finger structure of FIG. 1 in a flexed state.
Figure 6:
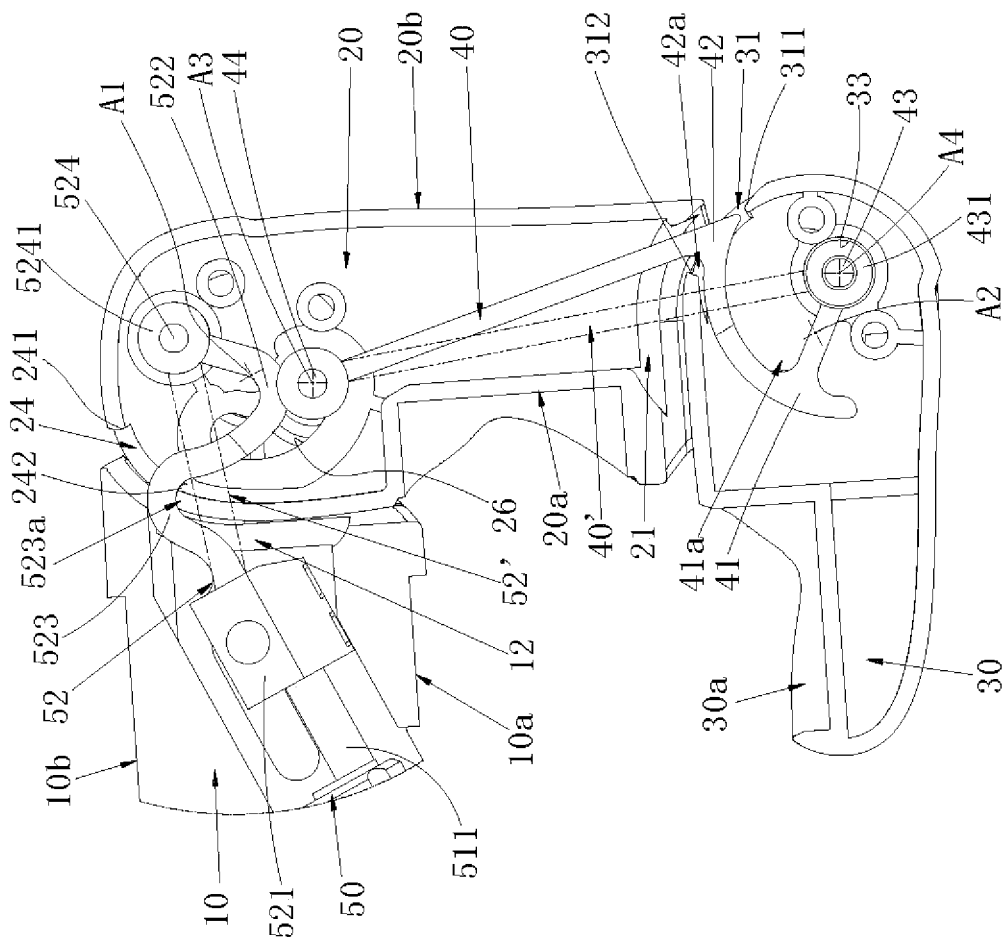
FIG. 6 shows the finger structure of FIG. 1 in a flexed state.
Figure 7:
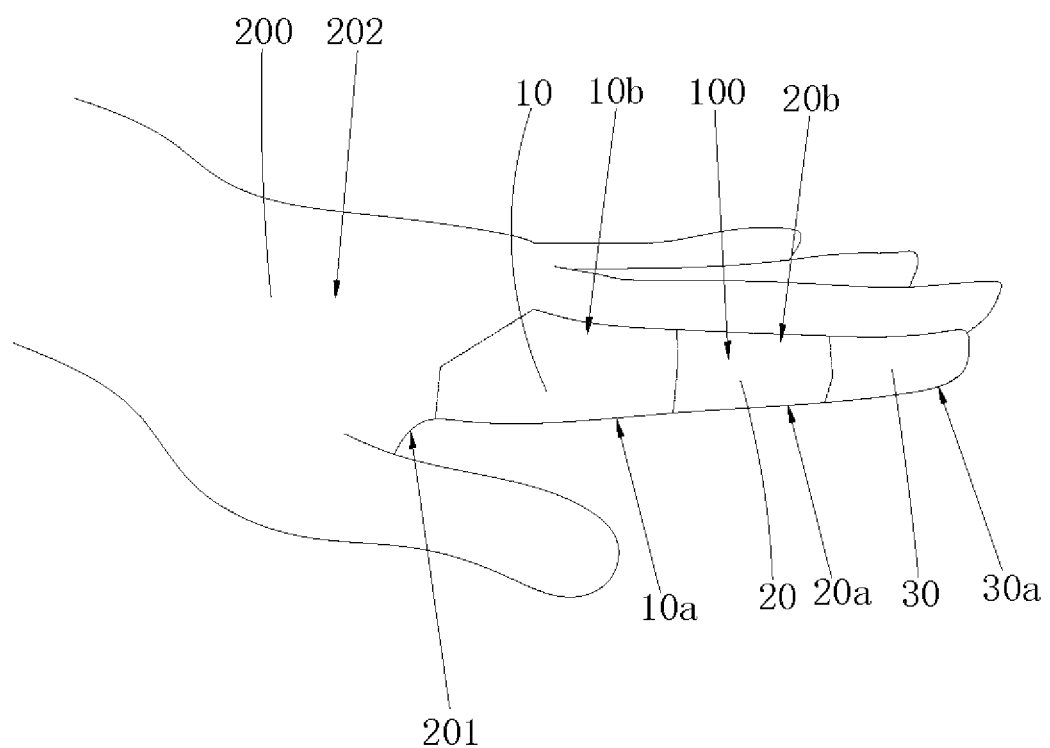
FIG. 7 is a schematic isometric view of a hand including the figure structure of FIG. 1.

Referring to FIGS. 1-4, a robotic finger 100 includes a proximal phalanx 10, a middle phalanx 20, a distal phalanx 30, a connecting rod 40 and an actuating assembly 50. The middle phalanx 20 is rotatably connected to one end of the proximal phalanx 10. The distal phalanx 30 is rotatably connected to one end of the middle phalanx 20. A1 in FIGS. 4-6 represents the axis of rotation between the middle phalanx 20 and the proximal phalanx 10, and A2 represents the axis of rotation between the distal phalanx 30 and the middle phalanx 20. Referring to FIG. 7, the front side 10a of the proximal phalanx 10, the front side 20a of the middle phalanx 20 and the front side 30a of the distal phalanx 30 face the same direction as the palmar side 201 of the palm 200 when the finger structure is in an extended state, which are respectively the lower side of the proximal phalanx 10, the lower side of the middle phalanx 20 and the lower side of the distal phalanx 30 shown in FIGS. 1 and 4. The back side 10b of the proximal phalanx 10 and the back side 20b of the middle phalanx 20 face the same direction as the dorsal side 202 of the palm 200 when the finger structure is in an extended state, which are respectively the upper side of the proximal phalanx 10 and the upper side of the middle phalanx 20 shown in FIGS. 1 and 4.

Figure 9:
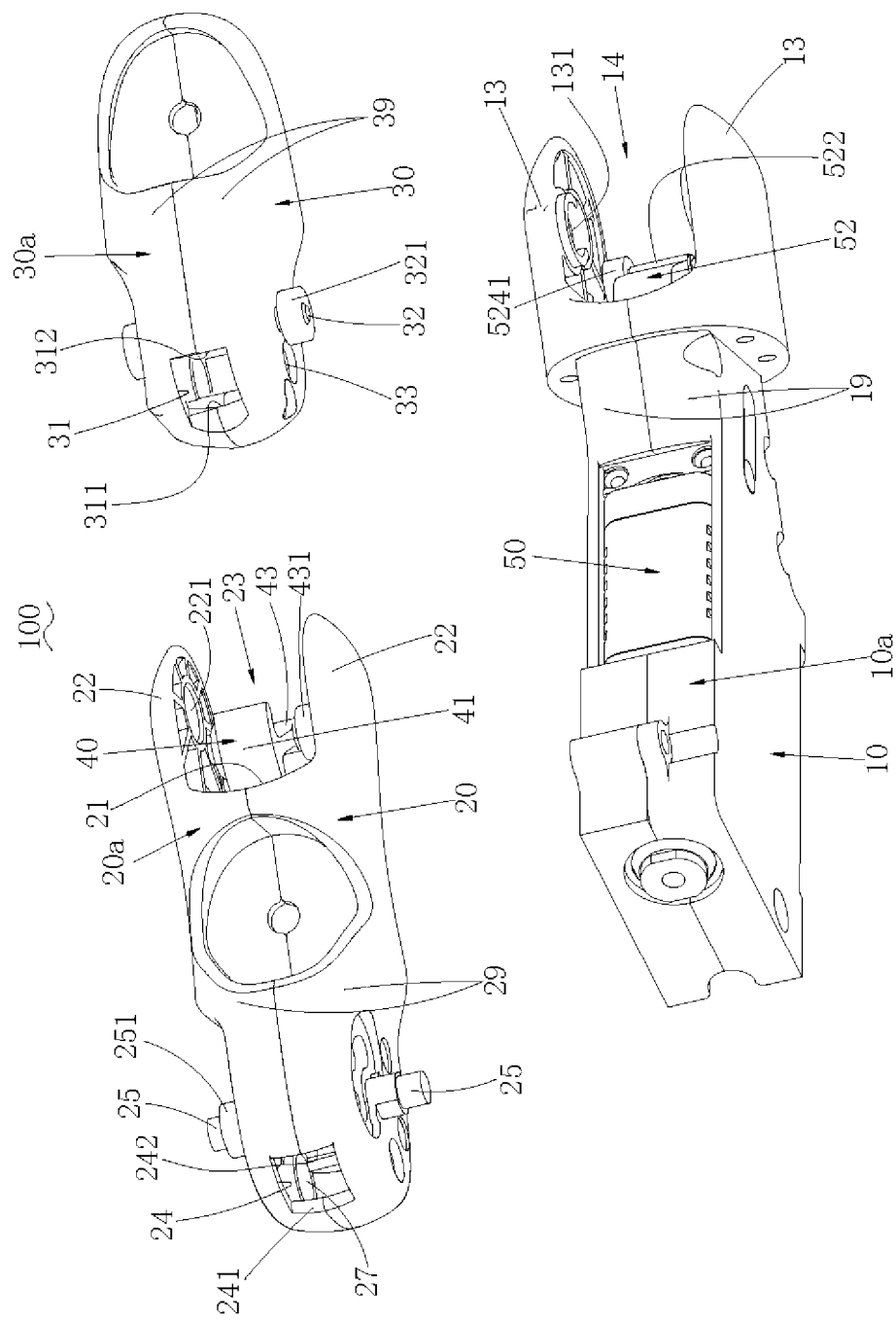
FIG. 9 is a schematic isometric exploded view of the finger structure of FIG. 8.

Referring to FIGS. 4, 7 and 10-11, the front side 30a of the distal phalanx 30 defines a distal phalanx opening 31 at one end adjacent to the middle phalanx 20. FIG. 4 shows partially the distal phalanx opening 31, while FIG. 9 shows the complete distal phalanx opening 31. The distal phalanx opening 31 has a first end 311 and a second end 312 that is opposite the first end 311. When the finger structure 100 is in the extended state, the first end 311 is closer to the palm 200 than the second end 312. Two opposite ends of the connecting rod 40 are respectively rotatably connected to the proximal phalanx 10 and the distal phalanx 30. A3 in FIGS. 4 to 6 represents the axis of rotation between the connecting rod 40 and the proximal phalanx 10, and A4 represents the axis of rotation between the connecting rod 40 and the distal phalanx 30.

Figure 8:
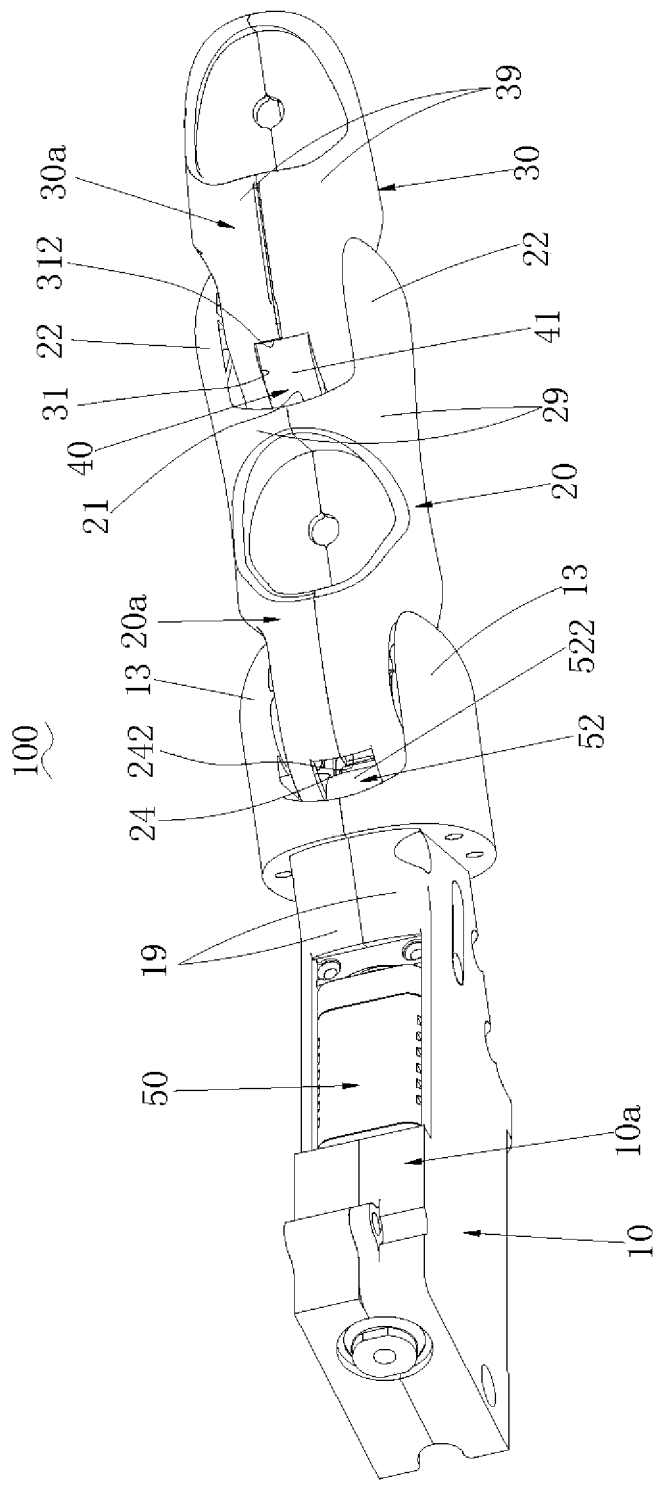
FIG. 8 is another schematic isometric view of the finger structure of FIG. 1.

Referring to FIG. 3, in one embodiment, the connecting rod 40 may include a first angled segment 41. Referring to FIG. 4, the first angled segment 41 defines a recess 41a facing a back side 20b of the middle phalanx 20. One end of the first angled segment 41 is rotatably connected to the distal phalanx 30, which allows the first angled segment 41 to be rotatable about the axis indicated by A4 of FIG. 4. When the distal phalanx 30 is flush with the middle phalanx 20, which is shown in FIGS. 2, 4, and 8, the first angled segment 41 passes through the distal phalanx opening 31, and the first end 311 of the distal phalanx opening 31 extends into the first recess 41a adjacent to the bottom of the recess 41a, which covers the distal phalanx opening 31. Here, the distal phalanx 30 being flush with the middle phalanx 20 means that they extend in substantially the same line, or that the distal phalanx 30 deflect slightly from the middle phalanx 20. For example, the deflection angle between the distal phalanx 30 and the middle phalanx 20 can be 5 degrees. The actuating assembly 50 drives the middle phalanx 20 to rotate with respect to the proximal phalanx 10.

Compared with the conventional finger structures, in the finger structure 100, the proximal phalanx 10, the middle phalanx 20, the distal phalanx 30, and the connecting rod 40 constitute a four-bar mechanism. Specifically, the proximal phalanx 10 serves as a fixed frame, the actuating assembly 50 drives the middle phalanx 20 to swing, the distal phalanx 30 moves together with the connecting rod 40, and the distal phalanx 30 swings in the same direction as the middle phalanx 20. That is, when the middle phalanx 20 rotates in a clockwise direction, the distal phalanx 30 rotates in the clockwise direction; and when the middle phalanx 20 rotates in a counterclockwise direction, the distal phalanx 30 rotates in the counterclockwise direction. With such configuration, extension and flexion of the finger structure 100 can be realized. The finger structure of FIG. 4 is in an extended state. If a straight connecting rod 40' indicated by the two-dot chain line is used, the straight connecting rod 40' will interfere with the distal phalanx 30. In order to avoid interference, a larger distal phalanx opening is needed. In the finger structure as described above, the connecting rod 40 includes the first angled segment 41 having a recess 41a facing a back side 20b of the middle phalanx 20. When the finger structure 100 is extended (i.e., when the distal phalanx 30 is flush with the middle phalanx 20 as shown in FIGS. 2 and 4), the first end 311 of the distal phalanx opening 311 extends into the recess 41a. In this case, no interference occurs without increasing the size of the distal phalanx opening 311.

Referring to FIGS. 4-6, during the flexion of the finger structure 100, that is, the distal phalangeal 30 and the middle phalanx 20 gradually change from being flush each other to being perpendicular to each other, the first angled segment 41 will gradually enter the distal phalanx 30. It can be seen that the first angled segment 41 has no adversely effect on the extension and flexion of the figure structure. Compared with conventional finger structures, the distal phalanx opening 31 of the finger structure 100 can be made smaller, which can improve the overall appearance integrity of the distal phalanx 30. Due to the existence of the first angled segment 41 of the connecting rod 40, when the distal phalanx shell 30 is subjected to impact, the connecting rod 40 will show certain elasticity and absorb the impact. When the external impact ceases, the distal phalanx 30 will return to the original state immediately due to the existence of elasticity.

Referring to FIGS. 4-6, in one embodiment, the four-bar mechanism constituted by the proximal phalanx 10, the middle phalanx 20, the distal phalanx 30 and the connecting rod 40 is a double rocker mechanism. Specifically, the proximal phalanx 10 serves as a fixed frame, and the middle phalanx 20 and the connecting rod 40 are both rockers. One end of the middle phalanx 20 and one end of the connecting rod 40 are respectively rotatably connected to the proximal phalanx 10, which allows the middle phalanx 20 and the connecting rod 40 to rotate about the axes of rotation A1 and A3. The opposite end of the middle phalanx 20 and the opposite end of the connecting rod 40 are respectively connected to the same end of the distal phalanx 30 at different positions, which allows the middle phalanx 20 and the connecting rod 40 to rotate about the axes of rotation A2 and A4. The actuating assembly 50 drives the middle phalanx 20 to swing, and the distal phalanx 30 moves together with the connecting rod 40. The distal phalanx 30 swings in the same direction as the middle phalanx 20. That is, when the middle phalanx 20 rotates in a clockwise direction, the distal phalanx 30 rotates in the clockwise direction; and when the middle phalanx 20 rotates in a counterclockwise direction, the distal phalanx 30 rotates in the counterclockwise direction. With such configuration, extension and flexion of the finger structure 100 can be realized. During flexion and extension of the finger structure 100, the line between the two pivot points of the middle phalanx 20 (i.e., the connection line between axes A1 and A2) and the line between the two pivot points of the connecting rod 40 (i.e., the connection line between axes A3 and A4) cross each other. In this way, the finger structure 100 can be flex and extend as a whole. That is, the actuating assembly 50 drives the middle phalanx 20 to swing, and the distal phalanx 30 swings in the same direction as the middle phalanx 20.

In an extended state, the proximal phalanx 10, the middle phalanx 20 and the distal phalanx 30 are flush with one another. In a flexed state, the proximal phalanx 10 is perpendicular to the middle phalanx 20, and the middle phalanx 20 is perpendicular to the distal phalanx 30. During the flexion and extension of the finger structure, the proximal phalanx 10, the middle phalanx 20 and the distal phalanx 30 swing in the same direction.

Referring to FIGS. 3-6, in one embodiment, the connecting rod 40 may further include a second angled segment 42. Referring to FIG. 4, the second angled segment 42 defines a recess 42a facing the front side 20a of the middle phalanx 20. One end of the second angled segment 42 is rotatably connected to the proximal phalanx 10, which allows the second angled segment 42 to rotate about axis A3. The recess 41a of the first angled segment 41 and the recess 42a of the second angled segment 42 face opposite directions. With such configuration, the elasticity of the connecting rod 40 can be improved to absorb external impact. When the external impact ceases, the distal phalanx 30 will return to the original state immediately.

Figure 10:
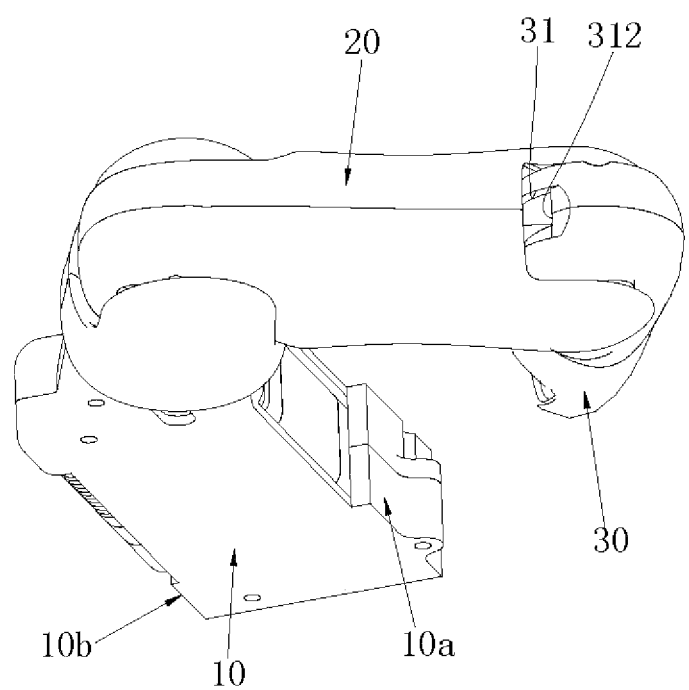
FIG. 10 shows the finger structure of FIG. 1 in a flexed state, with a connecting rod omitted.
Figure 11:
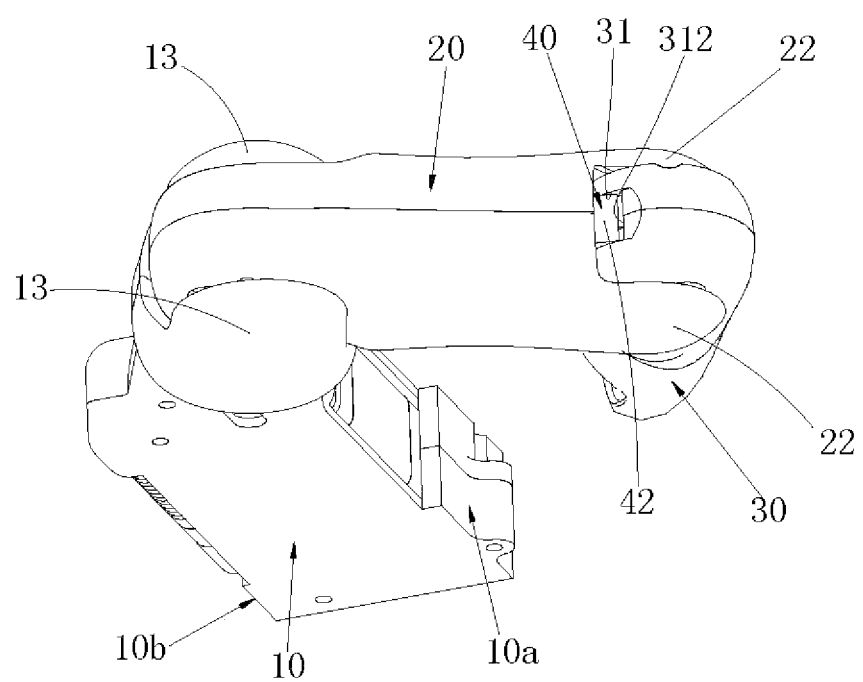
FIG. 11 is similar to FIG. 10, with the connecting rod included.

Referring to FIGS. 4-6 and 9, in one embodiment, when the distal phalanx 30 is perpendicular to the middle phalanx 20 as shown in FIG. 6, the first angled segment 41 is received in the distal phalanx 30, the second angled segment 42 passes through the distal phalanx opening 31, and the second end 312 of the distal phalanx opening 31 opposite the first end 311 extends into the second recess 42a of the second angled segment 42 adjacent to the bottom of the second recess 42a. The finger structure of FIG. 6 is in a flexed state. If a straight connecting rod 40' indicated by the two-dot chain line is used, the straight connecting rod 40' will interfere with the distal phalanx 30. In order to avoid interference, a larger distal phalanx opening is needed. In the finger structure as described above, the connecting rod 40 includes the second angled segment 42 having the recess 42a. In this case, no interference occurs without increasing the size of the distal phalanx opening 311. It can be seen that the second angled segment 42 has no adversely effect on the extension and flexion of the figure structure. Compared with conventional finger structures, the distal phalanx opening 31 of the finger structure 100 can be made smaller, which can improve the overall appearance integrity of the distal phalanx 30. As shown in FIGS. 10 and 11, when the finger structure 100 is in the flexed state, the second angled segment 42 basically obscures the distal phalanx opening 31 of the distal phalanx 30, reducing the area where the distal phalanx opening 31 is observed by people, and making the distal phalanx 30 have a better appearance.

Referring to FIGS. 2-4, 8, and 9, in one embodiment, a distal opening 21 is defined in one end of the middle phalanx 20 adjacent to the distal phalanx 30, the second angled segment 42 is received in the middle phalanx 20, and the second angled segment 42 passes through the distal opening 21. With such configuration, the connecting rod 40 can be better protected and the second angled segment 42 can be avoided to be exposed to the outside of the middle phalanx 20, which allows the finger structure 100 to have an aesthetic appearance.

Referring to FIGS. 2-4 and 9, in one embodiment, one end of the connecting rod 40 adjacent to the distal phalanx 30 includes a first pivot shaft 43, and two ends of the first pivot shaft 43 are rotatably connected to two opposite inner surfaces of the distal phalanx 30. For example, the opposite ends of the first pivot shaft 43 are rotatably received in two pivot holes 33 of the distal phalanx 30. With such configuration, the end of the connecting rod 40 adjacent to the distal phalanx 30 can be rotatably connected to the distal phalanx 30. The central axis of the first pivot shaft 43 is the axis of rotation A4 between the connecting rod 40 and the distal phalanx 30. The two ends of the first pivot shaft 43 are respectively supported on the two opposite inner surfaces of the distal phalanx 30 through bearings 431, which can reduce the friction between the first pivot shaft 43 and the distal phalanx 30, and is conducive to the reliable connection of the connecting rod 40 on the distal phalanx 30. The bearings 431 may be mounted in the pivot holes 33.

Referring to FIGS. 1-3 and 8-11, in one embodiment, the middle phalanx 20 includes two mounting walls 22 that are spaced apart from each other and define a mounting space therebetween. One end of the distal phalanx 30 is received in the mounting space, and rotatably connected to the mounting walls 22. In this way, one end of the distal phalanx 30 can be reliably rotatably connected to the middle phalanx 20. The proximal end of the distal phalanx 30 (i.e., the end with the distal phalanx opening 31) is arranged adjacent to the distal opening 21 of the middle phalanx 20, and the two mounting walls 22 obscure the left and right sides of the distal opening 21, so that a viewer can only observe the gap of the distal opening 21 at the front side 20a and the back side 20b of the middle phalanx 20 (see FIGS. 4-6), reducing the area where the distal opening 21 is exposed to the outside.

Referring to FIGS. 2, 3, and 9, in one embodiment, each of the two mounting walls 22 defines a mounting hole 221, and the distal phalanx 30 includes two shafts 32 that are rotatably received in the mounting holes 221. The shafts 32 are rotatably supported in the mounting holes 221 through two bearings 321. The provision of the bearings 321 can reduce the friction between the shafts 32 and the mounting holes 221, so that the shafts 32 can be reliably received in the mounting holes 221, thereby enabling one end of the distal phalanx 30 to be reliably rotatably connected to the middle phalanx 20.

Referring to FIGS. 2-6, in one embodiment, the actuating assembly 50 includes a linear actuator 51 arranged in the proximal phalanx 10 and a transmission member 52 driven by the linear actuator 51 and has an end connected to an output shaft 511 of the linear actuator 51. The opposite end of the transmission member 52 is rotatably connected to the middle phalanx 20. The axis of rotation between the transmission member 52 and the middle phalanx 20 is spaced apart a distance from the axis of rotation A1 between the proximal phalanx 10 and the middle phalanx 20. The linear actuator 51 may be an electric cylinder, which is convenient for outputting a predetermined displacement to control the motion of the finger structure 100. The linear actuator 51 pushes the transmission member 52 to move back and forth, which can drive the middle phalanx 20 to rotate relative to the proximal phalanx 10. It should be noted that the actuating assembly 50 is not limited can also adopt other means that can drive the middle phalanx 20 to rotate relative to the proximal phalanx 10.

Referring to FIGS. 2-4, in one embodiment, the transmission member 52 includes a connecting member 521 connected to the output shaft 511 of the linear actuator 51. The connecting member 521 includes a guide post 5211, and the proximal phalanx 10 defines a linear guide groove 11 in an inner surface thereof. The linear guide groove 11 extends along a direction in parallel with the output shaft 511 of the linear actuator 51, and the guide post 5211 is inserted into the linear guide groove 11 and slidable in the linear guide groove 11. The engagement of the guide post 5211 with the linear guide groove 11 can facilitate the forward and backward movement of the transmission rod 52 in a predetermined direction.

Referring to FIGS. 2-4 and 9, in one embodiment, one end of the transmission member 52 adjacent to the middle phalanx 20 includes a connecting shaft 524. Opposite ends of the connecting shaft 524 are rotatably connected to two opposite inner surfaces of the middle phalanx 20. For example, the opposite ends of the connecting shaft 524 are rotatably received in pivot holes 27 of the middle phalanx 20. This arrangement facilitates stable connection of one end of the transmission member 52 to the middle phalanx 20. The central axis of the connecting shaft 524 is the axis of rotation between the transmission member 52 and the middle phalanx 20. Opposite ends of the connecting shaft 524 are rotatably supported in the opposite inner surfaces of the middle phalanx 20 through two bearings 5241, which can reduce the friction between the connecting shaft 524 and the middle phalanx 20, so that the transmission member 52 can be reliably rotatably connected to the middle phalanx 20. The bearings 5241 may be mounted in the pivot holes 27.

Referring to FIGS. 2-4, 7-9, and 12-13, in one embodiment, the front side 20a of the middle phalanx 20 defines a proximal opening 24 at one end adjacent to the proximal phalanx 10. FIG. 4 shows partially the proximal opening 24, while FIG. 9 shows the complete proximal opening 24. The proximal opening 24 has a first end 241 and a second end 242 opposite the first end 241. When the finger structure 100 is in an extended state, the first end 241 is closer to the palm 200 than the second end 242. The transmission member 52 includes a first angled segment 522 having a first recess 522a that faces a back side 10b of the proximal phalanx 10. The first angled segment 522 has an end rotatably connected to the middle phalanx 20. When the proximal phalanx 10, the middle phalanx 20 and the distal phalanx 30 are flush with one another as shown in FIG. 4, the first angled segment 522 passes through the proximal opening 24, and the first end 241 of the proximal opening 24 extends into the first recess 522a adjacent to the bottom of the first recess 522a, which covers the proximal opening 24. The finger structure of FIG. 4 is in an extended state. If a straight connecting rod 52' indicated by the two-dot chain line is used, the straight connecting rod 52' will interfere with the middle phalanx 20. In order to avoid interference, a larger distal phalanx opening is needed. In the finger structure as described above, the transmission member 52 includes the first angled segment 522 having the recess 522a. In this case, no interference occurs without increasing the size of the proximal opening 24.

During the flexion of the finger structure 100 as shown in FIGS. 5 and 6, that is, the middle phalangeal 20 and the proximal phalanx 10 gradually change from being flush each other to being perpendicular to each other, the first angled segment 522 will gradually enter the middle phalanx 20. It can be seen that the first angled segment 522 has no adversely effect on the extension and flexion of the figure structure. Compared with conventional finger structures, the proximal opening 31 of the finger structure 100 can be made smaller, which can improve the overall appearance integrity of the middle phalanx 20. Due to the existence of the first angled segment 522 of the transmission member 40, when the distal phalanx shell 30 or the middle phalanx 20 is subjected to impact, the transmission member 52 will show certain elasticity and absorb the impact. When the external impact ceases, the middle phalanx 20 will return to the original state immediately due to the existence of elasticity.

Referring to FIGS. 2-4, in one embodiment, the transmission member 52 includes a second angled segment 523 connected to an end of the first angled segment 522. The second angled segment 523 defines a second recess 523a facing a front side 10a of the proximal phalanx 10 and has an end rotatably connected to the output shaft 211 of the linear actuator 51. The recess 522a of the first angled segment 522 and the recess 523a of the second angled segment 523 face opposite directions. With such configuration, the elasticity of the transmission member 52 can be improved to absorb external impact. When the external impact ceases, the middle phalanx 20 will return to the original state immediately.

Figure 12:
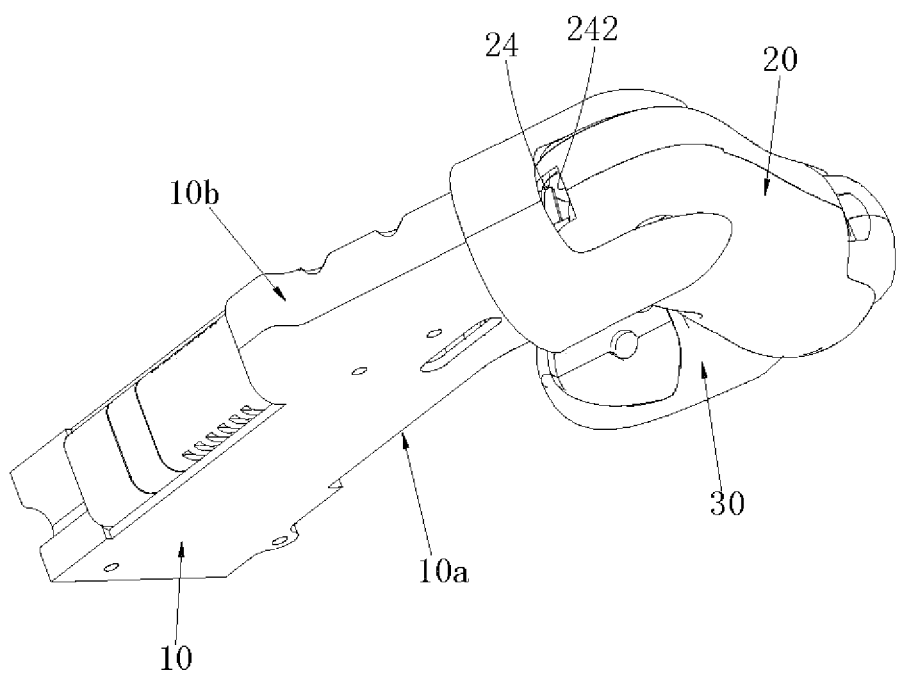
FIG. 12 shows the finger structure of FIG. 1 in a flexed state viewed from a different perspective, with a transmission member omitted.
Figure 13:
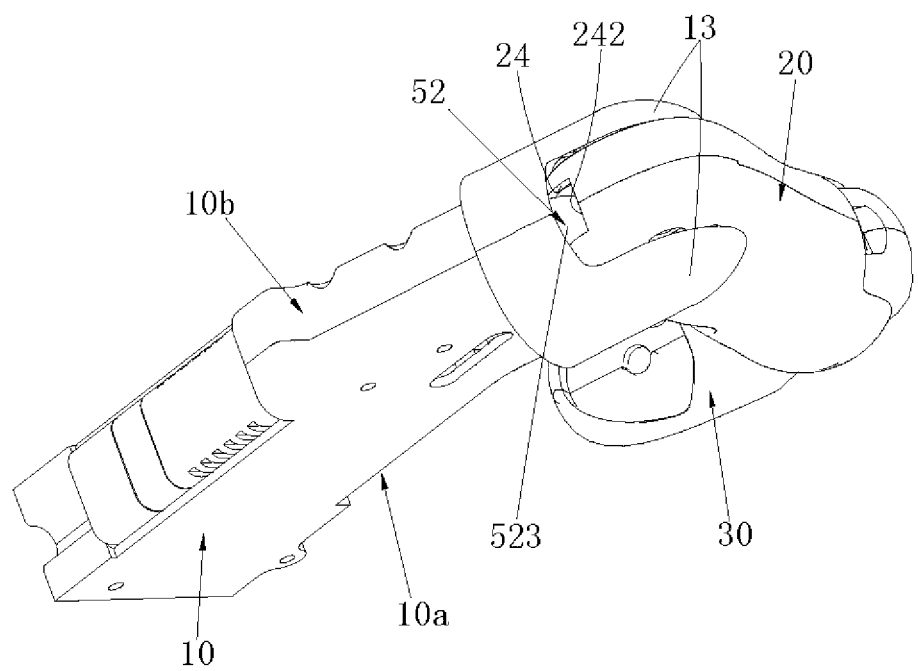
FIG. 13 is similar to FIG. 12, with the transmission member included.

Referring to FIGS. 3-6, in one embodiment, when the proximal phalanx 10 is perpendicular to the middle phalanx 20 as shown in FIG. 6, the first angled segment 522 is received in the middle phalanx 20, the second angled segment 523 passes through the proximal opening 24, and the second end 242 of the proximal opening 24 opposite the first end 241 extends into the second recess 523a of the second angled segment 523 adjacent to the bottom of the second recess 523a. The finger structure of FIG. 6 is in a flexed state. If a straight connecting rod 52' indicated by the two-dot chain line is used, the straight connecting rod 52' will interfere with the middle phalanx 20. In order to avoid interference, a larger proximal opening is needed. In the finger structure as described above, the transmission member 52 includes the second angled 523 42 having the recess 523a. In this case, no interference occurs without increasing the size of the proximal opening 24. It can be seen that the second angled segment 523 has no adversely effect on the extension and flexion of the figure structure. Compared with conventional finger structures, the proximal opening 24 of the finger structure 100 can be made smaller, which can improve the overall appearance integrity of the distal phalanx 30. As shown in FIGS. 12-13, when the finger structure 100 is in the flexed state, the second angled segment 523 basically obscures the proximal opening 24 of the middle phalanx 20, reducing the area where the proximal opening 24 is observed by people, and making the middle phalanx 20 have a better appearance.

Referring to FIGS. 2-4, in one embodiment, a proximal phalanx opening 12 is defined in one end of the proximal phalanx 10 adjacent to the middle phalanx 20, the second angled segment 523 is received in the proximal phalanx 10, and the second angled segment 523 passes through the proximal phalanx opening 12. With such configuration, the transmission member 52 can be better protected and the second angled segment 523 can be avoided to be exposed to the outside of the proximal phalanx 10, which allows the finger structure 100 to have an aesthetic appearance.

Referring to FIGS. 1-4 and 8-13, in one embodiment, the proximal phalanx 10 includes two mounting walls 13 that are spaced apart from each other and define a mounting space 14 therebetween. One end of the middle phalanx 20 is received in the mounting space 14, and rotatably connected to the mounting walls 13. In this way, one end of the middle phalanx 20 can be reliably rotatably connected to the proximal phalanx 10. The proximal end of the middle phalanx 20 (i.e., the end with the proximal opening 24) is arranged adjacent to the proximal phalanx opening 12 of the proximal phalanx 10, and the two mounting walls 13 obscure the left and right sides of the proximal opening 24, so that a viewer can only observe the gap of the proximal opening 24 at the front side 10a and the back side 10b of the proximal phalanx 10 (see FIGS. 4-6), reducing the area where the proximal phalanx opening 12 is exposed to the outside.

Referring to FIGS. 2-3 and 9, in one embodiment, each of the two mounting walls 13 defines a mounting hole 131, and the middle phalanx 20 includes two shafts 25 that are rotatably received in the mounting holes 131. The shafts 25 are rotatably supported in the mounting holes 131 through two bearings 251. The provision of the bearings 251 can reduce the friction between the shafts 25 and the mounting holes 131, so that the shafts 25 can be reliably received in the mounting holes 131, thereby enabling one end of the middle phalanx 20 to be reliably rotatably connected to the proximal phalanx 10. The bearings 251 can be mounted in the mounting holes 131.

Referring to FIGS. 2-4, in one embodiment, the middle phalanx 20 defines an arc-shaped guide groove 26 that is centered on an axis of rotation of the middle phalanx 20 relative to the proximal phalanx 10. One end of the connecting rod 40 has a shaft 44 that passes through the arc-shaped guide groove 26, and the shaft 44 is rotatably connected to at least one of the two mounting walls 13. For example, one end of the shaft 44 can be rotatably received in a pivot hole 132 of one mounting wall 13. The central axis of the shaft 44 is the axis of rotation between the connecting rod 40 and the proximal phalanx 10. The shaft 44 passes through the middle phalanx 20 and is connected to the proximal phalanx 10, and then one end of the connecting rod 40 is rotatably connected to the proximal phalanx 10. Opposite ends of the shaft 44 are rotatably supported in the mounting walls 13 through two bearings 441, which can reduce the friction between the shaft 44 and the mounting walls 13, so that the connecting rod 40 can be reliably rotatably connected to the mounting walls 13. The bearings 441 may be mounted in the pivot holes 132.

Referring to FIGS. 1-2 and 8-9, in one embodiment, the proximal phalanx 10 includes two casings 19 that are connected to each other and receive the actuating assembly 50 therein. The two casings 19 can be connected to each other by fasteners. With such configuration, the actuating assembly 50 and the transmission member 52 can be better protected and can be avoided to be exposed to the outside of the proximal phalanx 10, which allows the finger structure 100 to have an aesthetic appearance. Each of the casings 19 defines a recess, and the two recesses form the proximal phalanx opening 12 after the two casings 19 are connected to each other.

Referring to FIGS. 1-2 and 8-9, in one embodiment, the middle phalanx 20 two casings 29 that are connected to each other and partly receive the connecting rod 40 therein. The two casings 29 can be connected to each other by fasteners. With such configuration, the connecting rod 40 can be better protected and can be avoided to be exposed to the outside of the middle phalanx 20, which allows the finger structure 100 to have an aesthetic appearance. Each of the casings 29 defines a recess, and the two recesses form the proximal opening 21 after the two casings 29 are connected to each other.

Referring to FIGS. 1-2 and 8-9, in one embodiment, the distal phalanx 30 includes two casings 39 that are connected to each other and partly receive the connecting rod 40 therein. The two casings 39 can be connected to each other by fasteners. With such configuration, the connecting rod 40 can be better protected and can be avoided to be exposed to the outside of the distal phalanx 30, which allows the finger structure 100 to have an aesthetic appearance. Each of the casings 39 defines a recess, and the two recesses form the distal phalanx opening 31 after the two casings 39 are connected to each other.

In one embodiment, a robot includes the finger structure described above.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A robotic finger structure comprising:
   a proximal phalanx;
   a middle phalanx rotatably connected to one end of the proximal phalanx;
   a distal phalanx rotatably connected to one end of the middle phalanx, the distal phalanx defining a distal phalanx opening in a front side thereof and at one end adjacent to the middle phalanx;
   a connecting rod having opposite ends that are rotatably connected to the proximal phalanx and the distal phalanx, the connecting rod comprising a first angled segment having a first recess that faces a back side of the middle phalanx, the first angled segment comprising an end rotatably connected to the distal phalanx, wherein when the distal phalanx is flush with the middle phalanx, the first angled segment passes through the distal phalanx opening, and a first end of the distal phalanx opening extends into the first recess, which covers the distal phalanx opening; and
   an actuating assembly configured to drive the middle phalanx to rotate with respect to the proximal phalanx.

2. The robotic finger structure according to claim 1, wherein the connecting rod comprises a second angled segment connected to the first angled segment, the second angled segment defines a second recess facing a front side of the middle phalanx and comprises an end rotatably connected to the proximal phalanx.

3. The robotic finger structure according to claim 2, wherein when the distal phalanx is perpendicular to the middle phalanx, the first angled segment is received in the distal phalanx, the second angled segment passes through the distal phalanx opening, and a second end of the distal phalanx opening opposite the first end extends into the second recess.

4. The robotic finger structure according to claim 2, wherein a distal opening is defined in one end of the middle phalanx adjacent to the distal phalanx, the second angled segment is received in the middle phalanx, and the second angled segment passes through the distal opening.

5. The robotic finger structure according to claim 1, wherein one end of the connecting rod adjacent to the distal phalanx comprises a first pivot shaft, and two ends of the first pivot shaft are rotatably connected to two opposite inner surfaces of the distal phalanx.

6. The robotic finger structure according to claim 1, wherein the middle phalanx comprises two mounting walls that are spaced apart from each other and define a mounting space therebetween, one end of the distal phalanx is received in the mounting space, and rotatably connected to the mounting walls.

7. The robotic finger structure according to claim 6, wherein each of the two mounting walls defines a mounting hole, the distal phalanx comprises two shafts that are rotatably received in the mounting holes.

8. The robotic finger structure according to claim 1, wherein the proximal phalanx comprises two mounting walls that are spaced apart from each other and define a mounting space therebetween, one end of the middle phalanx is received in the mounting space, and rotatably connected to the mounting walls.

9. The robotic finger structure according to claim 8, wherein each of the two mounting walls defines a mounting hole, the middle phalanx comprises two shafts that are rotatably received in the mounting holes.

10. The robotic finger structure according to claim 8, wherein the middle phalanx defines an arc-shaped guide groove that is centered on an axis of rotation of the middle phalanx relative to the proximal phalanx, one end of the connecting rod comprises a shaft that passes through the arc-shaped guide groove, and the shaft is rotatably connected to at least one of the two mounting walls.

11. The robotic finger structure according to claim 1, wherein the proximal phalanx comprises two casings that are connected to each other and receive the actuating assembly therein, the middle phalanx comprises two casings that are connected to each other and partly receive the connecting rod therein, and the distal phalanx comprises two casings that are connected to each other and partly receive the connecting rod therein.

12. A robotic finger structure comprising:
   a proximal phalanx;
   a middle phalanx rotatably connected to one end of the proximal phalanx, the middle phalanx defining a proximal opening in a front side thereof and at one end adjacent to the proximal phalanx;
   a distal phalanx rotatably connected to one end of the middle phalanx;
   a connecting rod having opposite ends that are rotatably connected to the proximal phalanx and the distal phalanx; and
   an actuating assembly configured to drive the middle phalanx to rotate with respect to the proximal phalanx, the actuating assembly comprising a linear actuator and a transmission member driven by the linear actuator, the transmission member comprising a first angled segment having a first recess that faces a back side of the proximal phalanx, the first angled segment comprising an end rotatably connected to the middle phalanx, wherein when the proximal phalanx is flush with the middle phalanx, the first angled segment passes through the proximal opening, and a first end of the proximal opening extends into the first recess, which covers the proximal opening.

13. The robotic finger structure according to claim 12, wherein the transmission member comprises a second angled segment connected to the first angled segment, the second angled segment defines a second recess facing a front side of the proximal phalanx and comprises an end rotatably connected to the linear actuator.

14. The robotic finger structure according to claim 13, wherein when the proximal phalanx is perpendicular to the middle phalanx, the first angled segment is received in the middle phalanx, the second angled segment passes through the proximal opening, and a second end of the proximal opening opposite the first end extends into the second recess.

15. The robotic finger structure according to claim 13, wherein a proximal opening is defined in one end of the proximal phalanx adjacent to the middle phalanx, the second angled segment is received in the middle phalanx, and the second angled segment passes through the proximal opening.

16. The robotic finger structure according to claim 12, wherein the transmission member comprises a connecting member connected to the linear actuator, the connecting member comprises a guide post, the proximal phalanx defines a linear guide groove in an inner surface thereof, the linear guide groove extends along a direction in parallel with an output shaft of the linear actuator, and the guide post is inserted into the linear guide groove and slidable in the linear guide groove.

17. The robotic finger structure according to claim 12, wherein one end of the transmission member adjacent to the middle phalanx comprises a connecting shaft, and opposite ends of the connecting shaft are rotatably connected to two opposite inner surfaces of the middle phalanx.

18. A robot comprising:
a finger comprising:
a proximal phalanx;
a middle phalanx rotatably connected to one end of the proximal phalanx;
a distal phalanx rotatably connected to one end of the middle phalanx, the distal phalanx defining a distal phalanx opening in a front side thereof and at one end adjacent to the middle phalanx;
a connecting rod having opposite ends that are rotatably connected to the proximal phalanx and the distal phalanx, the connecting rod comprising a first angled segment having a first recess that faces a back side of the middle phalanx, the first angled segment comprising an end rotatably connected to the distal phalanx, wherein when the distal phalanx is flush with the middle phalanx, the first angled segment passes through the distal phalanx opening, and a first end of the distal phalanx opening extends into the first recess, which covers the distal phalanx opening; and
an actuating assembly configured to drive the middle phalanx to rotate with respect to the proximal phalanx.

19. The robot according to claim 18, wherein the connecting rod comprises a second angled segment connected to the first angled segment, the second angled segment defines a second recess facing a front side of the middle phalanx and comprises an end rotatable connected to the proximal phalanx.

20. The robot according to claim 19, wherein when the distal phalanx is perpendicular to the middle phalanx, the first angled segment is received in the distal phalanx, the second angled segment passes through the distal phalanx opening, and a second end of the distal phalanx opening opposite the first end extends into the second recess.

* * * * *